United States Patent [19]
Laroia et al.

[11] Patent Number: 5,388,124
[45] Date of Patent: Feb. 7, 1995

[54] PRECODING SCHEME FOR TRANSMITTING DATA USING OPTIMALLY-SHAPED CONSTELLATIONS OVER INTERSYMBOL-INTERFERENCE CHANNELS

[75] Inventors: Rajiv Laroia, Silver Spring; Nariman Farvardin, Rockville; Steven A. Tretter, Silver Spring, all of Md.

[73] Assignee: University of Maryland, College Park, Md.

[21] Appl. No.: 897,477

[22] Filed: Jun. 12, 1992

[51] Int. Cl.$^6$ .......................... H04L 25/34; H04L 5/12
[52] U.S. Cl. ........................................... 375/17; 375/39
[58] Field of Search ...................... 375/37, 39, 34, 17, 375/11, 14; 379/99, 101, 60, 17

[56] References Cited

U.S. PATENT DOCUMENTS

| | | | |
|---|---|---|---|
| 4,731,799 | 3/1988 | Longstaff et al. | 375/39 |
| 4,733,401 | 3/1988 | Longstaff | 375/37 |
| 4,905,254 | 2/1990 | Bergmans | 375/14 |
| 4,922,508 | 5/1990 | Moriya | 375/34 |
| 4,959,842 | 9/1990 | Forney, Jr. | 375/39 |
| 5,031,195 | 7/1991 | Chevillat et al. | 375/14 |
| 5,105,442 | 4/1992 | Wei | 375/39 |
| 5,113,412 | 5/1992 | Goldstein | 375/39 |
| 5,136,374 | 8/1992 | Jayant et al. | 358/133 |
| 5,150,381 | 9/1992 | Forney, Jr. et al. | 375/39 |
| 5,185,763 | 2/1993 | Krishnan | 375/39 |
| 5,214,672 | 5/1993 | Eyuboglu et al. | 375/34 |
| 5,231,485 | 7/1993 | Islaelsen et al. | 358/133 |
| 5,235,418 | 8/1993 | Lucas | 358/133 |

FOREIGN PATENT DOCUMENTS

383632A2 8/1990 European Pat. Off. .

Primary Examiner—Stephen Chin
Assistant Examiner—Kevin Kim
Attorney, Agent, or Firm—Christopher N. Sears

[57] ABSTRACT

A precoding scheme for noise whitening on ISI channels is presented where the scheme permits any type of shaping and is compatible with trellis coding. Its implementation complexity is significantly less than that of trellis precoding. The resulting reduction in shaping gain is small and becomes negligible as the rate per 2D of the constellation increases. This technique uses a structured vector quantization (SVQ) technique for optimal shaping of the constellation. Optimal (N-sphere) SVQ shaping results in higher shaping gains than those of Voronoi constellations based on known N-dimensional lattices. For a given $CER_2$ (or $PAR_2$) SVQ shaping results in optimal shaping. This is useful for implementation over QAM modems as significant shaping gains can be achieved even for a small constellation expansion. The SVQ-shaped constellations have a very reasonable implementation complexity. They allow for the possibility of opportunistic secondary channels, and there constituent 2D constellations are invariant to $\pi/2$ phase rotations (assuming cubic lattice based constellations). Compatibility of SVQ shaping with trellis coding was also demonstrated, resulting in the SVQ-shaped trellis-coded modulation scheme which can realize both shaping and coding gains. For transmission over ISI channels, SVQ shaping can be used together with the precoding scheme to realize shaping gains up to 1.15 dB.

15 Claims, 5 Drawing Sheets

PRECODING SCHEME FOR TRANSMITTING DATA USING OPTIMALLY-SHAPED CONSTELLATIONS OVER INTERSYMBOL-INTERFERENCE CHANNELS

FIELD OF INVENTIONS

The present invention deals with transmitting binary data and relates particularly to a precoding scheme that allows optimal shaping of constellations on intersymbol interference channels. This invention is well adapted for use with trellis coded modulation and also provides a method for the shaping of multidimensional coded constellations.

BACKGROUND ART

There is significant interest in reliably sending digital data over narrow band channels such as voice-band telephone lines at the highest possible rates. The highest rate current international standards for voice-band modems are the CCITT V.32 bis and V.33 standards for transmission at 14.4 kilo bits per second (kbps) with prospective standards calling for rates up to at least 24 kbps. Some nonstandard commercial modems that achieve this high rate on some channels are currently available. However, to achieve higher data rates, the modems use more of the available bandwidth of the channel and employ signal constellations with more points. The wider bandwidth transmitted signals are more severely distorted by the voice-band channels which cause both severe amplitude response rolloff and envelope delay distortion at the lower and upper band edges. The result, in the time-domain, of these deficiencies is an increase in intersymbol interference (ISI). In addition, a signal constellation with more points is adversely affected by additive noise and nonlinearity in the channel. Currently existing and some proposed high speed modems use complicated channel trellis codes and trellis precoding/shaping. These techniques require higher computational resources in the hardware and also lack some flexibility in choosing a variety of data rates.

Constellation shaping refers to methods that reduce the transmitted signal power for a fixed minimum distance between constellation points. This technique allows more reliable data transmission over channels corrupted by additive noise. The trellis precoding/shaping technique mentioned in the previous paragraph is currently employed in some commercial modems. The structured vector quantizer (SVQ) shaping method described below can achieve superior shaping gain at the same complexity of the trellis precoding/shaping method. Also, the SVQ technique can easily incorporate constraints on the constellation peak-to-average ratio with almost no loss of shaping gain. Furthermore, the SVQ technique can easily accommodate flexible data rates.

Precoding is used in transmitters to compensate for distortion introduced by the channel response and/or noise whitening filters used in the modem receivers. The precoding method disclosed below is significantly simpler to implement than the trellis precoding technique and can be used with a variety of shaping methods without destroying the shaping gain. The combination of constellation shaping and precoding reduces the effects of intersymbol interference and noise enhancement and allows for more reliable data transmission at high data rates.

High speed modems use more of the available channel bandwidth, that is, have wider bandwidth transmitted signals, because they must use a higher symbol (baud) rate. This leads to more ISI because the spectrum of the transmitted signal extends into the channel band edges where amplitude attenuation and envelope delay distortion become severe. To compensate for this channel distortion, a linear equalizer can be used at the channel output. But, by boosting the band edges, the equalizer enhances and correlates the noise. Alternatively, decision feedback equalization (DFE) can be used to eliminate ISI without noise enhancement. When used in coded modulation systems, DFE results in high complexity decoding techniques as discussed in M. V. Eyuboglu and S. U. H. Qureshi, "Reduced-State Sequence Estimation for Coded Modulation on Intersymbol Interference Channels," *IEEE J. Select. Areas Commun*, Vol. 7, pp. 989-995, August 1989. Tomlinson-Harashima precoding as discussed in M. Tomlinson, "NeW Automatic Equalizer Employing Modulo Arithmetic," *Electron. Lett.*, Vol. 7, pp. 138-139, March 1971, and H. Harashima and H. Miyakawa, "Matched-Transmission Technique for Channels with Intersymbol Interference," *IEEE Trans. Commun.*, Vol. 30, pp. 774-780, August 1972, equalizes the signal before transmission, is relatively simple to implement and can be used with coded modulation. However, this precoding scheme does not realize any shaping gain that results from having a spherical constellation boundary rather than a cubic boundary. Recently, Eyuboglu and Forney ("Trellis Precoding: Combined Coding, Precoding and Shaping for Intersymbol Interference Channels," *IEEE Trans. Inform. Theory*, Vol. 38, pp. 301-314, March 1992) have proposed a trellis precoding scheme that whitens the noise at the equalizer output. This scheme combines precoding and trellis shaping (G. D. Forney, Jr., "Trellis Shaping," *IEEE Trans. Inform. Theory*, Vol. 38, pp. 281-300, March 1992) and achieves 0.7-0.9 dB shaping gain with a 4-state trellis. However, there are, drawbacks of trellis precoding which include: (i) the complexity is dependent on the number of states in the shaping-trellis and (ii) it is compatible only with trellis shaping and cannot be combined with other shaping schemes such as the optimal shaping scheme described by the invention below. This invention describes a new precoding scheme that is simple to implement, is transparent to shaping and can be used in place of Tomlinson-Harashima precoding to realize both coding and shaping gains over ISI channels.

Prior art related to modem encoding/decoding techniques includes U.S. Pat. No. 4,731,799 of Longstaff et al. that describes a means and method to convert data by block coding. Limitations of this teaching include: (i) no provision for constrained constellation expansion ratio, (ii) it does not disclose a means or method for combining multidimensional constellation shaping with a required constant expansion ratio and (iii) no extension to trellis coded systems.

The SVQ shaping scheme for use in modems is based on a structured vector quantizer that was introduced by Laroia and Farvardin in "A Structured Fixed-Rate Vector Quantizer Derived from a Variable-Length Scalar Quantizer," submitted to *IEEE Trans. Inform. Theory*, August 1991). The structure of the codebook of this structured vector quantizer (SVQ) is derived from a variable-length scalar quantizer. Here, we borrow some ideas from the SVQ for the shaping of multidimensional constellations. Of particular interest in this context are the codevector encoding and decoding techniques of the SVQ. These techniques index (label) each vector of the codebook of an N-dimensional SVQ with a unique Nr-bit binary number c (codeword), where r is the rate of the SVQ in bits/sample.

SUMMARY OF THE INVENTION

It is a primary objective of this invention to develop a precoding scheme for noise whitening on intersymbol interference channels. This scheme is compatible with trellis-coded modulation and unlike Tomlinson precoding allows constellation shaping. The precoding is transparent to shaping and can be used with almost any shaping scheme and particularly with the optimal SVQ shaping scheme disclosed below as opposed to trellis precoding which can only be used with trellis shaping. The implementation complexity of this scheme is minimal—only three times that of the noise prediction filter, and hence effective noise whitening can be achieved by using a high-order predictor.

It is also a primary objective of this invention to incorporate within this precoding scheme a means for shaping of multidimensional constellations. This shaping scheme uses some of the ideas from a type of structured vector quantizer originally proposed for the quantization of memoryless sources, and results in N-sphere shaping of N-dimensional cubic lattice based constellations. Its implementation complexity is very reasonable. Because N-sphere shaping is optimal in N dimensions, shaping gains higher than those of N-dimensional Voronoi constellations can be realized. Optimal shaping for a large N however has the undesirable effect of increasing the size and the peak-to-average power ratio of the constituent 2D constellation, thus limiting its usefulness in practical implementation over commercially available quadrature amplitude modulation (QAM) modems. It is shown that this invention alleviates this problem by achieving close to optimal constellation shapes for a given limit on the constellation expansion ratio or the peak-to-average power ratio of the constituent 2D constellation. Additionally, compatibility with trellis-coded modulation is demonstrated for the realization of both shaping and coding gain, thus yielding a scheme that has a distinct edge over lattice-bounded constellations.

It is also an objective of the invention to provide a precoding scheme that is useful in any bandlimited communication system or data storage system over non-ideal channels.

It is another objective of the invention to provide for a high data rate modem.

It is another objective of the invention to provide an encoding/decoding technique for modems that can be used with trellis coding and allows limiting the constellation expansion ratio in 2 dimensions.

BRIEF DESCRIPTION OF DRAWINGS

Details of the invention will be revealed in the following description with reference to the accompanying drawings wherein FIG. 1 (Prior Art) is a block diagram of a simple pre-equalization system for noise whitening.

DETAILED DESCRIPTION

I. Precoding for Noise Whitening

Figure 1:
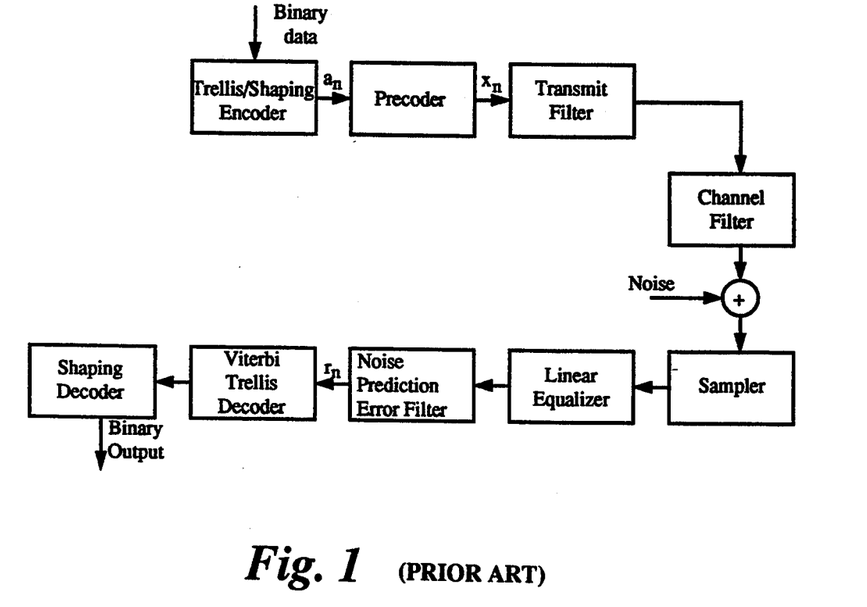

Consider the block diagram of a simple pre-equalization system shown in FIG. 1 (Prior Art). This system uses a noise prediction-error filter $H(z)$ to whiten the noise at the equalizer output. The ISI introduced by the prediction-error filter in the receiver is compensated for at the transmitter by the Precoder block which either linearly pre-equalizes the signal with the filter $1/H(z)$ or uses a Thomlinson precoder before transmission. Here it is assumed that the noise prediction-error filter $H(z)$ is minimum phase and hence the pre-equalizer $1/H(z)$ is stable. It can be shown that the optimal (minimum mean squared-error) linear predictor of a given order is always minimum phase. The problem with the above system is that the output $x_n$ of the pre-equalizer can have large peaks even when the pre-equalizer input $a_n$ is peak-limited. Also, $x_n$ can have a significantly higher average power than $a_n$, eliminating the shaping gain that could have been realized if the channel were ideal. To solve these problems, we propose the invention shown in FIG. 2. In the disclosed invention, the pre-equalizer or Tomlinson precoder has been replaced by a nonlinear precoder, hereafter referred to as the Laroia, Tretter, Farvardin (LTF) Precoder, shown in FIG. 4. The ISI introduced by the noise prediction-error filter is not directly compensated for by the precoder but is totally removed after Viterbi trellis decoding. The nonlinear precoder only modifies its input signal $a_n$ slightly, just enough to ensure that the input $r_n$ to the Viterbi trellis decoder is always an additive white noise affected version of a sequence consistent with the trellis. The sequence $r_n$ can therefore be decoded using the Viterbi trellis decoder and then the ISI can be removed. This is much simpler than DFE schemes for coded modulation such as reduced-state sequence estimation and parallel decision feedback decoding, where the ISI is removed within the trellis decoder leading to a complex decoding technique.

In FIG. 1 (Prior Art) consecutive blocks of binary source data bits enter the Trellis/Shaping Encoder which selects a sequence of constellation points consistent with the trellis of a channel coding code and a constellation shaping scheme. The sequence of 2-dimensional symbols, $a_n$, generated by the Trellis/Shaping Encoder is applied to the Precoder which either linearly pre-equalizes the signal with the transfer function $1/H(z)$ or performs Tomlinson precoding designed for $H(z)$ in the receiver. The Precoder compensates for the effects of the Noise Prediction Error Filter in the receiver. The resulting sequence, $x_n$, is applied to the Transmit Filter which turns the discrete-time sequence $x_n$ into a bandlimited continuous-time signal which can be transmitted through the communication channel. The block labelled Channel Filter represents the amplitude and phase distortion of the communication channel. In addition, the channel is assumed to add noise to the transmitted signal. The received signal is sampled by the block labelled Sampler at a rate consistent with the sampling theorem and a convenient multiple of the channel symbol rate. The resulting discrete-time signal is applied to the block labelled Linear Equalizer which has the function of cancelling the amplitude and phase distortion introduced by the channel. It is typically an adaptive transversal filter using the least-mean-square error (LMS) technique. The block labelled Noise Prediction Error Filter $H(z)$ whitens the noise component of its input so that the Viteri Trellis Decoder in the next block can use a simple optimal technique. The Viterbi Trellis Decoder finds the most likely transmitted sequence given the observed received sequence. Finally, the Shaping Decoder converts the symbol sequence generated by the Viterbi decoder back to the best estimate of the original input binary data from the source.

Figure 2:
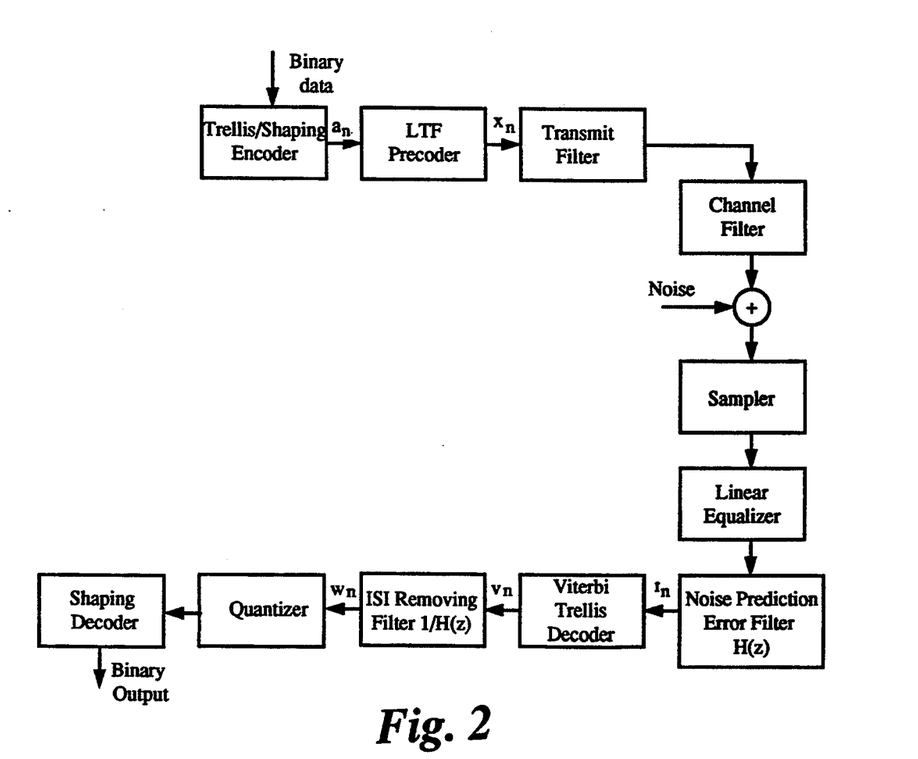
FIG. 2 is a block diagram showing the precoding scheme with constellation shaping.

The invention shown in FIG. 2 is now described. Successive blocks of source data bits enter the Trellis/Shaping Encoder. This block selects a sequence of constellation points consistent with a trellis path selected by the channel trellis code and also shaped by the SVQ shaping technique described in detail below. The output $a_n$ of the Trellis/Shaping Encoder is applied to the LTF Precoder. The LTF precoder nonlinearly modifies $a_n$ to compensate for the Noise Prediction Error Filter in the receiver in such a way that very small changes are made to $a_n$ and the output of the Noise Prediction Error Filter in the receiver is still a sequence following the same set of cosets as $a_n$. The theory of operation for the LTF precoder is described in detail below. The precoder output, $x_n$, is applied to a well known Transmit Filter which turns the discrete-time input into a bandlimited continuous-time signal that is transmitted over the channel. The block labelled Channel Filter represents the amplitude and phase distortion caused by the linear filtering effects of the channel. Noise is also added to the signal by the channel. At the receiver, the signal is sampled at a rate consistent with the sampling theorem and a convenient multiple of the symbol rate. The resulting discrete-time signal is applied to the block labelled Linear Equalizer. The purpose of the linear equalizer is to remove the amplitude and phase distortion caused by the channel. It is typically implemented as an adaptive transversal filter using the LMS technique. The equalization process colors the additive channel noise. The equalizer output is applied to the Noise Prediction Error Filter block which has the transfer function $H(z)$ resulting in the output signal $r_n$. The purpose of the noise prediction error filter is to whiten the noise component of the equalizer output so that a simple optimal Viterbi decoding technique can be used. Next, $r_n$ is sent to a standard Viterbi Trellis Decoder for the channel trellis code resulting in the output signal $v_n$ which is applied to the ISI Removing Filter. The ISI Removing Filter converts its input $v_n$ into the output signal $w_n$ which is identical to the output of the Precoder in the transmitter when no decoding errors occur at the output of the Viterbi trellis decoder. The output, $w_n$, of the ISI removing filter is converted back to the original input, $a_n$, to the precoder of the transmitter by the block labelled Quantizer. The block labelled Shaping Decoder uses the SVQ technique described in detail below to convert the Quantizer output back to the binary data sequence.

The LTF precoding method has several advantages over other precoding schemes. First, only one filter is used in the LTF precoder which helps reduce the complexity. Additionally, the LTF precoding method uses an all-zero (FIR) filter in the receiver for noise whitening rather than an all-pole (IIR) filter. The all-pole approach does not guarantee stability of the $1/H(z)$ filter while the all-zero approach does.

Figure 3:
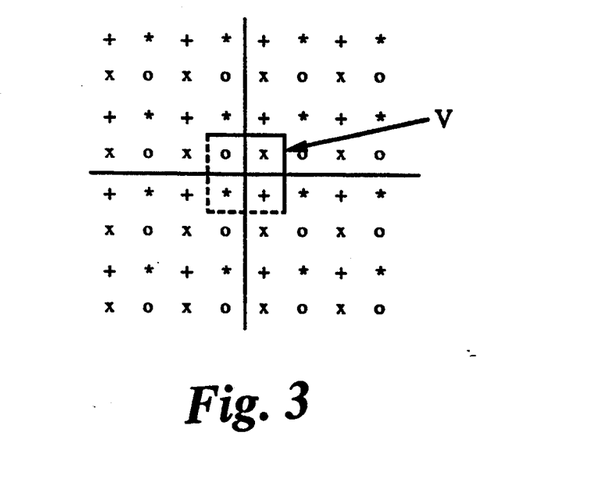
FIG. 3 shows the constituent 2D lattice used in the encoder trellis of FIG. 2 with 2 coded bits per 2D (4 cosets).

FIG. 3 shows the constituent translated 2D lattice $\Lambda+(\frac{1}{2},\frac{1}{2})=Z^2+(\frac{1}{2},\frac{1}{2})$ of a trellis-coded multidimensional constellation. This lattice is the union of $2^u$ cosets of a sublattice $\Lambda'$, where u is the number of coded bits per 2D (u=2 and $\Lambda'=2Z^2$ in FIG. 3). Let V denote the Voronoi region of the sublattice $\Lambda'$. The points on the boundary of V are either included or excluded from V in such a manner that V contains no two different points that are modulo $\Lambda'$ equivalent. Note that in FIG. 3, if $a_n$ is a sequence of points in $Z^2+(\frac{1}{2},\frac{1}{2})$ that is consistent with the trellis, then the sequence $a_n+2(i_n,j_n)$ is also consistent with the trellis for $i_n, j_n \in Z$. In general, any sequence that is equivalent to $a_n$ modulo $\Lambda'$ is consistent with the trellis. This fact establishes that the input to the Viterbi trellis decoder in FIG. 2 is the noise affected version of a sequence that is consistent with the trellis.

Figure 4:
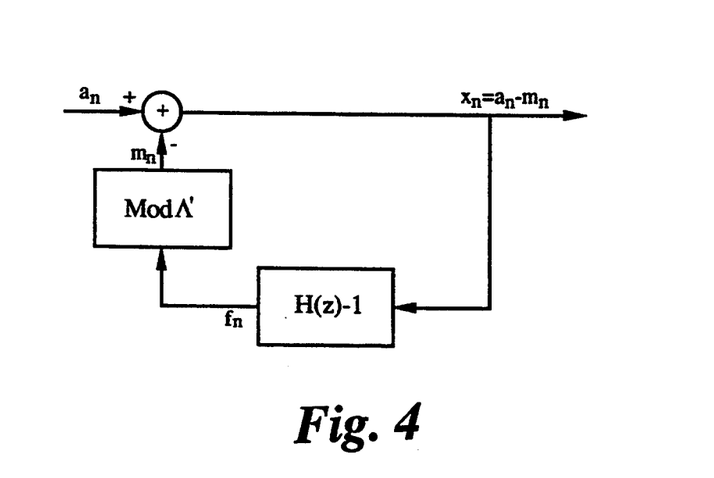
FIG. 4 shows the block diagram of the precoder of FIG. 2.
Figure 5:
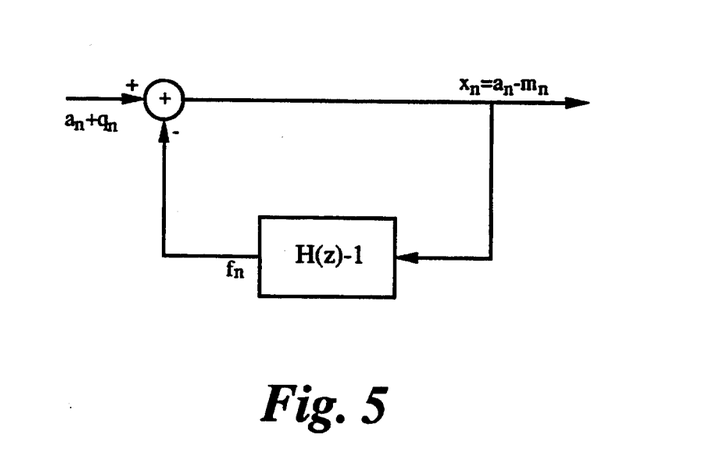
FIG. 5 shows the equivalent linear representation of the precoder of FIG. 4.

Next, consider the nonlinear LTF precoder shown in FIG. 4. The feedback $f_n$ in this precoder can be expressed as the sum of two components, $m_n$ and $q_n$, where $m_n=f_n$ mod $\Lambda'$ and $q_n=f_n-m_n$ is the quantized feedback. The quantity $q_n$ is the result of quantizing $f_n$ to the nearest point in $\Lambda'$ such that the quantization error $m_n \in V$. The nonlinear precoder of FIG. 4 is equivalent to the linear precoder of FIG. 5 with the input $a_n$ replaced by $a_n+q_n$.

Assuming that the linear equalizer eliminates the ISI introduced by the channel, the output of the noise prediction-error filter in FIG. 2 is $r_n=a_n+q_n+z_n$, where $z_n$ is the whitened noise sequence. Since $a_n$ and $a_n+q_n$ are mod $\Lambda'$ equivalent, $r_n-z_n$ is a sequence that is consistent with the trellis. Hence $r_n$ can be decoded using the Viterbi trellis decoder resulting in $v_n=a_n+q_n$ (assuming no decoding error) at the output of the Viterbi decoder. To remove the ISI caused by $q_n$, the sequence $v_n$ is passed through the linear filter $1/H(z)$ of FIG. 5 to obtain the sequence $w_n=a_n-m_n$ from which $a_n$ can be recovered by picking the point closest to $w_n$ (quantizing $w_n$) that belongs to the same coset as $v_n$. This follows since $a_n$ is in the same coset as $v_n$ and $m_n \in V$. The sequence $a_n$ can be converted to binary data just as in the ideal channel case. Since the ISI removing filter $1/H(z)$ is stable, any decoding errors that occur do not propagate indefinitely.

The LTF precoding filter (and the quantization operation) in the transmitter should be exactly identical to the ISI removing filter (and the following quantizer) in the receiver. Even a slight difference (perhaps in the precision of the arithmetic used) can cause a significant increase in the error probability.

The transmitted sequence $x_n$ is the sum of two independent components, a small dither, $-m_n$ and the trellis encoder output $a_n$. The average power of $x_n$ is therefore the sum of the average powers of $a_n$ and $m_n$. For an ideal channel, only $a_n$ needs to be transmitted ($x_n=a_n$ when $H(z)=1$), the additional power $E\{m_n^2\}$ is hence the price paid for transmitting over ISI channels. The transmission of additional power results in a reduction in the effective shaping gain of the constellation. For non-ideal channels ($H(z) \neq 1$), it is reasonable to assume that $m_n$ is uniformly distributed in V and the additional power needed is the average power of V.

When the rate of the constellation is large, the average power of $a_n$ is considerably larger than the average power of V and hence only a small reduction in shaping gain results. As an example, consider a trellis-coded constellation with 2 coded bits/2D, a coding redundancy of 0.5 bits/2D (as in 4D 16-state Wei code L. F. Wei, "Trellis-Coded Modulation with Multidimensional Constellations," *IEEE Trans. Inform. Theory*, Vol. IT-33, pp. 483–501, 1987) and a rate of 7.5 bits/2D. If no shaping is used, the average power of this constellation (normalized to 2D) is $(16^2-1)/6 = 42.50$. Even if optimal shaping is used (1.53 dB shaping gain) the transmitted power is no less than $42.50/1.422 = 29.88$. Since the average power of the region V (in this case a $2 \times 2$ square) is 0.667, the resulting loss in shaping gain in no more than 0.095 dB. Together with the fact that a very reasonable complexity 64-dimensional SVQ shaping (as described below) results in 1.26 dB shaping gain on ideal channels, this suggests that a net shaping gain of 1.16 dB can be achieved on ISI channels by using the proposed precoding scheme on SVQ-shaped constellations. This is significantly higher than the shaping gains possible with trellis precoding of comparable complexity. According to M. V. Eyuboglu and G. D. Forney, Jr., "Trellis Precoding: Combined Coding, Precoding and Shaping for Intersymbol Interference Channels," *IEEE Trans. Inform. Theory*, Vol. 38, pp. 301–314, March 1992, most of the prediction gain in voice-band telephone line channels can be achieved by using as few as 2 to 3 taps in the noise prediction filter. Since the complexity of LTF precoding is small—only three times the complexity of the noise prediction filter—a higher-order predictor can be easily implemented making the noise almost white and resulting in larger prediction gains than trellis precoding.

Although, as mentioned before, any decoding errors that occur do not propagate indefinitely because the ISI removing filter $1/H(z)$ is stable, they can propagate for a long duration if $H(z)$ has zeros close to the unit-circle. If this is the case, the filter $1/H(z)$ in the precoder and the identical ISI removing filter in the receiver can be implemented as FIR filters with an impulse response that is the truncated version of the response of $1/H(z)$. The 'feedback' $f_n$ (see FIG. 5) is then generated from the past values of the filter input $a_i + q_i$, ($i<n$) rather than the output $x_i$. This will ensure that the effect of any error is limited to a fixed-duration. It might appear at first that the FIR filter will require a large number of taps to cancel the ISI effects of the noise prediction-error filter (especially if $H(z)$ has zeros near the unit-circle), but as the following argument suggests, this may not be essential. If the FIR filter has a small order, implementing an approximation of $1/H(z)$, the channel equalizer (which adapts based on the output of the noise prediction-error filter) will interpret this as an exact implementation of $1/H(z)$ but a slightly modified channel response. The equalizer will then adapt to compensate for this modified channel response. The above approximation is effectively equivalent to a slight mismatch between the precoder and the channel, possibly leading to a small increase in the noise variance. Exactly how much the noise variance increases is a function of the extent of mismatch. Another cause of this mismatch between the precoder and the channel is a drift in the channel characteristics with time while the precoder is kept fixed.

With this scheme, even in principle it is not possible to transmit at channel capacity. This is because for transmitting at or near capacity, almost all of the coding gain must be realized by using powerful (possibly very complex) trellis codes. For such codes however, the region V will become large, and hence for a given transmission rate, the shaping gain will eventually disappear.

To physically implement the schematic shown in FIG. 2, each of the functional blocks, except for the Transmit Filter, could be realized by one or more appropriately programmed microprocessors, microcoded digital signal processing chips, etc. The Transmit Filter can be realized by performing the majority of the spectral shaping using a program in a digital signal processing chip followed by a digital-to-analog converter followed, in turn, by an analog lowpass filter using standard hardware techniques.

II. Shaping of Signal Constellations

A constellation C generally consists of a set of points on an N-dimensional lattice $\Lambda$ that is enclosed within a finite region R. The simplest N-dimensional constellation consists of all the points on a cubic lattice enclosed within an N-cube. This is the baseline system and the performance of all the more complex constellations is measured in terms of gains over this constellation. There are two kinds of gains that can be achieved over the baseline system. The first is obtained by using a more densely packed N-dimensional lattice than the N-dimensional cubic lattice and is called the coding gain $\gamma_c$. The second is the shaping gain $\gamma_s$ that results from using a more spherical bounding region R than an N-cube. When the region R is big and encloses a large number of lattice points, the distribution of points in R can be approximated by a continuous uniform distribution over R. This is the continuous approximation and, unless mentioned otherwise, in this disclosure we assume that it holds. Under the continuous approximation, the coding gain is decoupled from the shaping gain and both can be realized independently. Here we focus on the shaping gain which is defined as the ratio of the average energy of a baseline constellation with the same number of points as the given constellation, to the average energy of the given constellation when the minimum distance between points in both constellations is the same. Under the continuous approximation, this is the same as the inverse ratio of the average energy of the constellation region R to the average energy of the region bounded by an N-cube of the same volume as R; this is also referred to as the shaping gain of the region R. The region that has the smallest average energy for a given volume is an N-sphere. For a given N therefore, the shaping gain is bounded by the shaping gain of an N-sphere. The maximum possible shaping gain is 1.423 (1.53 dB) which is the limit of the N-sphere shaping gain as N becomes large. The shaping gains of the generalized cross constellations described in G. D. Forney, Jr. and L. F. Wei, "Multidimensional Constellations—Part I: Introduction, Figures of Merit, and Generalized Cross Constellations," *IEEE J. Select. Area Commun.*, Vol. 7, No. 6, pp. 877–892, August 1989, are limited to about 0.4 dB while the Voronoi constellations of known lattices can achieve gains as high as 1.1 dB.; see G. D. Forney, Jr., "Multidimensional Constellations—Part II: Voronoi Constellations," *IEEE J. Select. Area Commun.*, Vol. 7, No. 6, pp. 941–958, August 1989, also U.S.

Pat. No. 4,959,842, G. D. Forney, "Signal Constellation".

A constituent 2D constellation of a given N-dimensional (we assume an even N) constellation C is the set of all values that a given two-dimensional symbol takes as the N-dimensional signal points range through C. The constellation C is termed as a 2D-symmetric constellation if it has the same constituent 2D constellation for all possible pairs of dimensions. In this case we say that the constituent 2D constellation of C is $C_2$. For constellations that are not 2D-symmetric, $C_2$ is taken as the union of all the different constituent 2D constellations. Some attributes of the constituent 2D constellations are important from the view point of implementation over QAM-based (quadrature amplitude modulation) modems and are described next.

The shaping constellation expansion ratio $CER_2$ of the constituent 2D constellation $C_2$ of C is defined as the ratio of the size $|C_2|$ of $C_2$ to the size $|C|^{2/N}$ of the constituent 2D constellation of a baseline N-cube bounded constellation containing the same number of points as in C. Therefore $CER_2 = |C_2|/|C|^{2/N}$ and is lower-bounded by unity. The peak-to-average power ratio ($PAR_2$) of $C_2$ is defined as the ratio of the squared-distance of the farthest point(s) in $C_2$ from the origin, to the average energy of points in C normalized to two dimensions (assuming all points in C are equally probable). The $PAR_2$ of the baseline N-cube bounded constellation is 3. For implementation on QAM-based modems it is desirable to have both a small $PAR_2$ and a small $CER_2$.

The Voronoi region $\bar{R}_V(\Lambda) \in \mathbb{R}^N$ of an N-dimensional lattice $\Lambda$ is defined as the set of points in $\mathbb{R}^N$ that are at least as close (in the Euclidean distance sense) to the origin as to any other point in the lattice. The conventional approach of bounding the constellation by the Voronoi region of a lattice is based on the fact that the Voronoi regions of some N-dimensional lattices can approximate an N-sphere (especially for large N). J. H. Conway and N. J. A. Sloane, "A Fast Encoding Method for Lattice Codes and Quantizers," *IEEE Trans. Inform. Theory*, Vol. IT-29, pp. 106-109, 1985, have shown that algorithmic indexing or labeling of the points in such constellations can be performed (look-up tables are generally impractical for a large N) leading to modest complexity encoding/decoding techniques. Although for large N the Voronoi region bounded constellations can achieve a significant portion of the maximum possible shaping gain of 1.53 dB, this usually comes at the cost of an equally significant increase in $CER_2$ and $PAR_2$.

For the rest of this disclosure the shaping of constellations based on the structured vector quantizer codebook is referred to as SVQ shaping.

A. The Structured Vector Quantizer (SVQ)

In this section, the basic principles of the SVQ encoding and decoding techniques are presented. The SVQ decoder assigns blocks of source data bits to m-dimensional codevectors in the SVQ codebook which forms the transmitted signal constellation. The SVQ encoder is used in the modem receiver to assign blocks of data bits to received m-dimensional constellation points. The application of these SVQ techniques to constellation shaping, and modifications that result in more computationally efficient algorithms are presented in the following sections.

The SVQ is a special kind of vector quantizer (VQ) in which the codebook structure is derived from a variable-length quantizer S. Let $Q \equiv \{q_1, q_2, \ldots, q_n\}$ be the set of n elements in the alphabet of the quantizer S (Q is also referred to as the SVQ alphabet) and $L \equiv \{l_1, l_2, \ldots, l_n\}$ be the corresponding set of positive integer lengths, where $l_i$, $i \in J_n \equiv \{1, 2, \ldots, n\}$ is the length associated with the element $q_i$. The codebook Z of an m-dimensional SVQ V derived from $S \equiv (Q, L)$ is a subset of $Q^m$ consisting of only those points (m-tuples) that have a total length no greater than an integer threshold L. The total length is defined as the sum of the lengths of the individual components and the threshold L is chosen such that the codebook Z contains (at least) $2^{mr}$ of the $n^m$ total points in $Q^m$, where r is the desired rate of the SVQ V in bits/sample. This is formally described by the following definition.

Definition: An m-dimensional SVQ V derived from a variable-length quantizer $S \equiv (Q, L)$ is a VQ with a codebook Z given as, $$Z = \{z = (z_1, z_2, \ldots, z_m) \in Q^m : l_{f(z_1)} + l_{f(z_2)} + \cdots + l_{f(z_m)} \leq L\}, \quad (1)$$

where the index function $f: Q \to J_n$ is defined as:
$$f(q_i) = i, i \in J_n. \quad (2)$$

For a rate r bits/sample SVQ, the threshold L is selected as the smallest integer such that the cardinality of Z is no less than $2^{mr}$.

With this structure of the SVQ codebook, there exist fast and efficient techniques for codebook search and codevector encoding/decoding. Given a point in $\mathbb{R}^m$, codebook search amounts to determining the vector in the codebook that is closest, in some distance measure, to the given point. Of primary interest here are the threshold determination and the encoding/decoding techniques of the SVQ and these are described next. The encoding/decoding techniques label each vector in the SVQ codebook with a unique mr-bit binary number.

Determination of the threshold L: For a given set of lengths L and a desired per sample rate r, the threshold L can be obtained by counting the grid-points (starting with the ones that have the smallest total length) until there are $2^{mr}$ points and then taking the largest total length for which all grid-points of that length are included in this collection.

Let $M_i^j$ represent the number of distinct i-vectors $(v_1, v_2, \ldots, v_i) \in Q^i$ such that their total length $l_{f(v_1)} + l_{f(v_2)} + \cdots + l_{f(v_i)} = j$. Then $M_i^j$ satisfies the following recursive equation $\forall i \in J_m$:

$$M_i^j = \sum_{k=1}^{n} M_{i-1}^{j-l_k},$$

where $M_i^j = 0$ for $j < 0$ and $M_0^0 = 1$. The $M_i^j$ can hence be determined by solving these equations. A technique similar in structure to the Viterbi technique will do this job. Define $C_m^j$ as the number of m-vectors in $Q^m$ that have a total length no greater than j. Clearly $C_m^j = \Sigma_{k=1}^{j} M_m^k$. The threshold L is now given as, $L = \min\{j : C_m^j \geq 2^{mr}\}$.

The inequality in the last equation ensures that there are no less than $2^{mr}$ codevectors for a given rate r. The $M_i^j; \forall i \in J_{m-1}, \forall j \in J_L$, and $C_m^j; \forall j \in J_L$, that are a byproduct of threshold determination, can be stored in memory for use in the encoding/decoding techniques that follow.

Encoding of codevectors: The codebook Z consists of $2^{mr}$ codevectors. The encoder is a mapping which assigns a unique mr-bit binary number or codeword to each of these codevectors. There are several possible ways to do this—the following technique implements one such mapping.

To each codevector $z=(z_1, z_2, \ldots, z_m) \in Z$ assign an m-digit base n number $M(z)=(f(z_1)-1, f(z_2)-1, \ldots, f(z_m)-1)=\Sigma_{k=1}^m n^{m-k}(f(z_k)-1)$. Clearly, $M(z_1)=M(z_2) \rightleftharpoons z_1=z_2$. All the codevectors are now ordered according to the following two rules—1.) a codevector $z_1$ is 'smaller than' a codevector $z_2$ (i.e., $z_1<z_2$) if $T(z_1)<T(z_2)$, where $T(z)$ denotes the total length of $z$; and 2.) if $T(z_1)=T(z_2)$ then $z_1<z_2$ if $M(z_1)<M(z_2)$. The encoder function $E: Z \rightarrow \{0\} \cup J_{2^{mr}-1}$ is defined as the number of vectors in Z that are smaller than the given codevector, i.e., $$E(z) = \sum_{\substack{w \in Z \\ T(w)=T(z)}} I_{z,w} + C_m^{T(z)-1},$$
$$= \epsilon(z) + C_m^{T(z)-1},$$

where $I_{z,w}=0$ if $M(w) \geq M(z)$; 1 otherwise, and $C_m^0=0$. The function $E(z)$ in the above equation gives the total number of length $T(z)$ codevectors that are smaller than $z$. We can further write $E(z)=\Sigma_{k=1}^m E_k(z)$, where $E_k(z)$ is the number of length $T(z)$ codevectors w such that the base n representations of $M(z)$ and $M(w)$ are identical in the $k-1$ most significant digits, while the $k^{th}$ digit of $M(w)$ is smaller than that of $M(z)$. It is simple to see that $E_k(z)=\Sigma_{j=1}^{f(z_k)-1} M_{m-k}^{T(z)-L_k-1-l_j}$, $k \in J_m$, where $L_0=0$ and $L_i=\Sigma_{j=1}^{i} l_{f(z_j)}$; $i \in J_m$. The encoder function can hence be written as, $$E(z) = \sum_{k=1}^m \sum_{j=1}^{f(z_k)-1} M_{m-k}^{T(z)-L_k-1-l_j} + C_m^{T(z)-1}.$$

Given that $M_i^j$ and $C_m^j$; $\forall i \in J_{m-1}$; $\forall j \in J_L$, are computed once and stored in the memory, this equation shows that the total number of additions required (per dimension) for the encoding operation is upper-bounded by n (in fact it is approximately upper-bounded by n' ($<$n), where n' is the number of distinct length values in L). It should be noted though that each of $C_m^j$ and $M_i^j$ can be up to mr bits long. An important feature of this technique is that the codevectors with the largest length are assigned the largest codewords.

Decoding of codevectors: The decoder function $E^{-1}: \{0\} \cup J_{2^{mr}-1} \rightarrow Z$, is the inverse of the encoder and assigns a unique m-dimensional codevector to every mr-bit binary codeword. The decoding can be performed as follows. Given a codeword c, first compare it with the $C^j_m$; $j \in J_L$ and determine the length $T(z)$ of the codevector z corresponding to c. Let $c'=c-C_m^{T(z)-1}$. the decoding is now done one dimension at a time starting with $z_1$. Compare $c'$ with the total number $M_{m-1}^{T(z)-l_{f(q_1)}}$ of codevectors beginning with $q_1$ that have length equal to $T(z)$. If $c'<M_{m-1}^{T(z)-l_{f(q_1)}}$, then $z_1=q_1$; else compare $c'-M_{m-1}^{T(z)-l_{f(q_1)}}$ with the number of codevectors $M_{m-1}^{T(z)-l_{f(q_2)}}$ beginning with $q_2$ and so on until $z_1$ is determined. Now the problem reduces to an equivalent (m−1)-dimensional problem which can similarly be handled. This technique when implemented efficiently requires at most n' additions (subtractions) per dimension of the codevector.

The implementation complexities of the encoding and decoding operations are very reasonable for relatively large n and m.

B. SVQ Shaping

Consider the quantization of N-vectors from a stationary memoryless unit variance Gaussian source. By the asymptotic equipartition principle (AEP), for a large N, these N-vectors with a high probability lie inside an N-sphere of squared-radius N. To quantize this source therefore, an N-dimensional VQ that has a codebook consisting of all points on some lattice that are enclosed inside an N-sphere can be used. This is the rationale behind lattice-bounded lattice codebooks of M. V. Eyuboglu and A. S. Balamesh, "Lattice and Trellis Quantization with Lattice-and Trellis-Bounded Codebooks-Construction and Implementation for Memoryless Sources," submitted to *IEEE Trans. Inform. Theory*, October 1991, where the boundary lattice has a Voronoi region that approximates an N-sphere and this region is used to shape the codebook boundary. We now show that by a suitable choice of Q, L and L, the SVQ can also be used for the N-sphere shaping of the codebook. We consider codebooks based on integer cubic lattices scaled by a positive real $\alpha$ and hence $Q=\{-k\alpha, \ldots, -\alpha, 0, \alpha, \ldots, k\alpha\}$ for some suitably large k. If we define $l_i=(q_i/\alpha)^2$; $\forall |i| \leq k$, then the N-dimensional SVQ codebook consists of all points of the cubic lattice that lie inside and on an N-sphere of squared-radius $\alpha^2 L$. The encoding technique of the SVQ can be used to assign unique codewords to each vector in the codebook. In fact, any set of points in $\mathbb{R}^N$ that can be specified by some choice of Q,L and L can be encoded using the SVQ encoding technique.

In the framework of signal transmission, the constellation is analogous to the quantizer codebook. As mentioned above, the N-dimensional constellation that minimizes the average power for a given number of points on a lattice is bounded by an N-sphere. In the continuous approximation, this statement holds irrespective of the type of lattice. To achieve an appreciable shaping gain, the constellation dimension should be large implying that algorithmic indexing of constellation points is necessary. The conventional approach to the indexing problem is to shape the constellations using Voronoi regions of lattices because fast encoding/decoding of points in such constellations can be performed by a technique given by J. H. Conway and N. J. A. Sloane, "A Fast Encoding Method for Lattice Codes and Quantizers," *IEEE Trans. Inform. Theory*, Vol. IT-29, pp. 106–109, 1985. The approach required is to exploit the similarity between an optimally shaped constellation and the SVQ codebook for a Gaussian source and use the SVQ encoding/decoding techniques for indexing the constellation points.

The optimally shaped N-dimensional cubic lattice based constellation can be specified as the codebook of an N-dimensional SVQ for $Q=\}-k\alpha, \ldots, -\alpha, 0, \alpha, \ldots, k\alpha\}$, $l_i=(q_i/\alpha)^2$ and an appropriate L determined (using the technique given earlier in this section) for the required number of points on the constellation. From the continuous approximation, L is (approximately) the squared-radius of an N-sphere enclosing $2^{Nr}$ lattice-points and is linear in N. This makes the computational complexities of the SVQ encoding and decoding techniques for these constellations linear in N and their storage complexities cubic in N. These constellations can hence be implemented (with a reasonable complexity) for large N making it possible to realize almost all of the maximum shaping gain of 1.53 dB. If complexity does cause a problem, it can be reduced by dividing all the lengths in L by some $p > 1$ and then quantizing them to the nearest integers. This will also reduce the threshold L resulting in reduced complexity encoding and decoding techniques. The shaping in this case will obviously be sub-optimal.

The overall operation of the transmitter/receiver associated with an N-sphere SVQ-shaped cubic lattice based constellation can be described as follows. The transmitter takes Nr bits from the input stream and uses an SVQ decoder to convert these bits to a constellation point (N-vector) which is transmitted. At the receiver, the channel output is first quantized, using a bank of N scalar quantizers (or N/2 successive uses of a pair of quantizers), to the nearest point on the cubic lattice. This will give back the transmitted constellation point (assuming channel noise does not cause an error) which is converted to an Nr-bit binary stream using the SVQ encoder.

Although optimal shaping gains are realized by SVQ shaping, the above discussion has been limited to cubic lattices which offer no coding gain. More densely packed lattices (or trellis codes) can result in significant coding gains. The SVQ shaping can be combined with trellis coding to realize both shaping and coding gains. Indexing of constellation points in this case is performed using the encoding/decoding techniques of the trellis-based SVQ.

C. Shaping and Constellation Expansion Ratio

Figure 8:
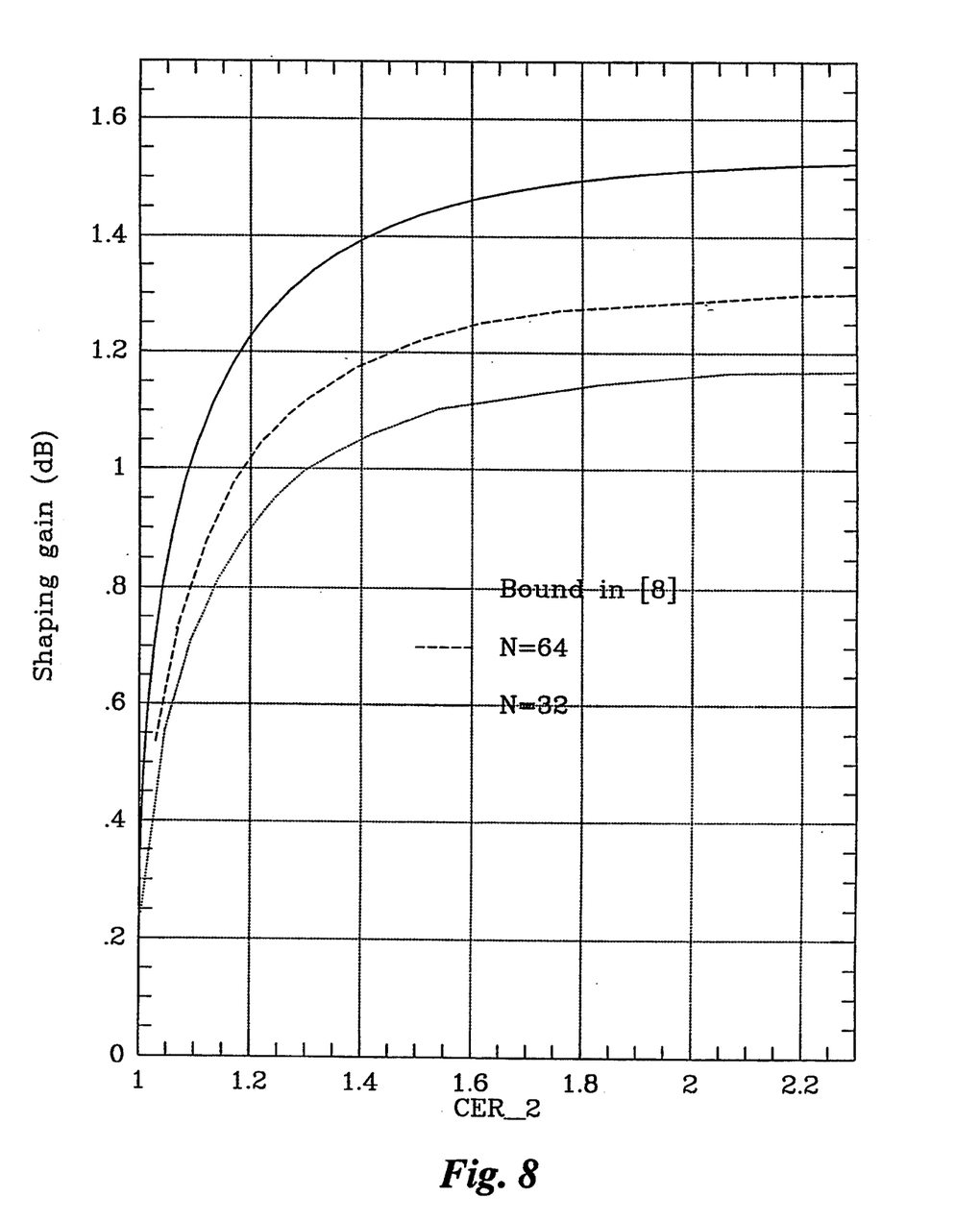
FIG. 8 shows the shaping gain $\gamma_s$ as a function of $CER_2$ for optimal SVQ shaping.
Figure 9:
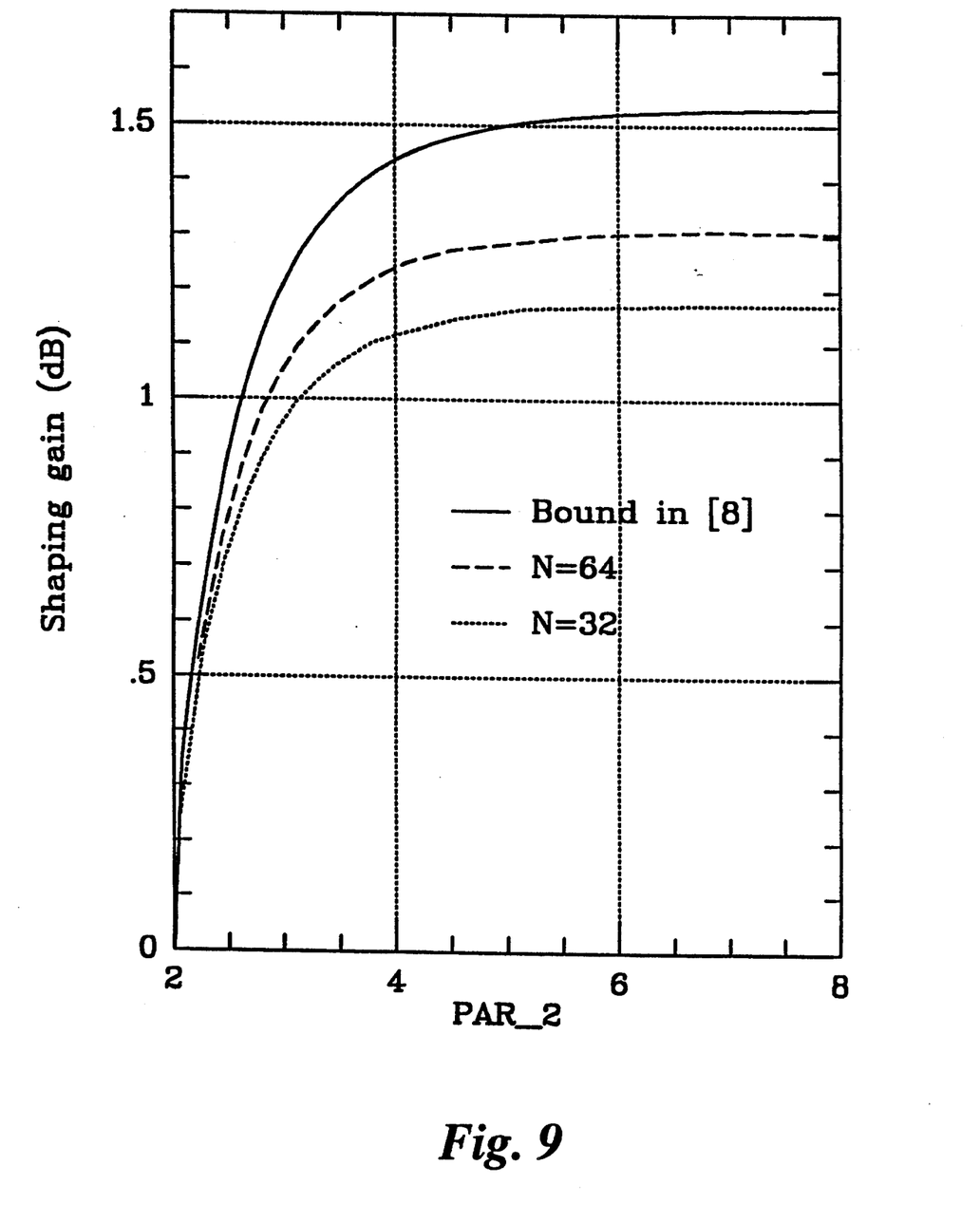
FIG. 9 shows the shaping gain $\gamma_s$ as a function of $PAR_2$ for optimal SVQ shaping.

While N-sphere shaping achieves the best shaping gains, it also results in large $CER_2$ and $PAR_2$. FIGS. 8 and 9 give the shaping gain $\gamma_s$, $CER_2$ and $PAR_2$ of N-spheres for various N. For large N, the probability of occurrence of the points in the constituent 2D constellation is not uniform but is close to a 2-dimensional Gaussian distribution even when the constellation points themselves are equally probable. Channel capacity arguments also show that the optimal distribution of points in the constituent 2D constellation is the 2-dimensional Gaussian distribution. Because of this the points of the constituent 2D constellation that occur most frequently are the ones that are close to the origin, hence the average energy (per two dimensions) of this constellation is small and this is the reason for its large shaping gain. On the other hand, the points on the periphery of the constituent 2D constellation are very improbable suggesting that even if these points are removed (resulting in a smaller $CER_2$) good shaping gains should still be possible. Bounds on the shaping gain for a given $CER_2$ and $PAR_2$ derived above show that large shaping gains at considerably smaller values of $CER_2$ and $PAR_2$ than those required for N-spheres are possible. These bounds are achieved (asymptotically in N) by SVQ shaping.

A subtle point worth observing is the following. The definition of the constituent 2D constellation given above is not all inclusive. For a QAM modem based implementation, all that is really required is that the N dimensions be partitioned into a set of N/2 pairs of dimensions and the constituent constellation along any pair in this set, if they are all the same (if not, take the largest of such constituent constellations), can be taken as the constituent 2D constellation. This is less restrictive than requiring that the constituent 2D constellation be the same for all possible pairs of dimensions. Although it is not mentioned, the bounds on shaping gain derived above are asymptotically achievable only for a constraint on the expansion ratio $CER_2$ of this less restrictive definition of the constituent 2D constellation. For the rest of this disclosure we use these new definitions of the constituent 2D constellation $C_2$ and the constellation expansion ratio $CER_2$.

To demonstrate that optimal SVQ shaping is possible for a given (constraint on) $CER_2$, we first consider the simpler problem of optimal SVQ shaping for a given $CER_1$, which is the constellation expansion ratio of the constituent 1D constellation $C_1$ (the constituent 1D constellation is defined as the largest of the constituent constellations along each dimension). This will be generalized to the 2D case.

C.1. Optimal shaping for a given $CER_1$

The problem is to determine the shaping region of a rate r (bits per dimension) N-dimensional cubic lattice based constellation, that maximizes the shaping gain for $1 \leq CER_1 \leq \beta$. For this rate the baseline constellat $(2^r - 1)\alpha$ and has $2^r$ points in its constituent 1D constellation. The desired constellation has at most $\delta = \beta 2^4$ points in its constituent 1D constellation and is a subset of points inside an outer N-cube of side $\beta(2^r - 1)\alpha$. It is obvious that the best way to choose a given (small) number of points inside the outer N-cube while minimizing the average energy is to choose them inside an N-sphere (centered at the origin) of appropriate radius. As the number of points to be chosen increases, the radius of the N-sphere (that contains them) also increases until the sphere begins to intersect with the outer N-cube. When that happens, only the points that lie inside the intersection of the N-sphere interior and the outer N-cube interior must be included in the collection. The size of the N-sphere can be increased if necessary to accommodate a total of $2^{Nr}$ points in the required constellation. This procedure of choosing the constellation points ensures that the points closest to the origin (minimum energy) that satisfy the outer N-cube constraint are chosen first. Hence the resulting constellation has the smallest possible average power for the required number of points. The shaping region of this constellation will be the intersection of an N-sphere interior and an N-cube interior. It might happen that for a small N (and large $\beta$) the N-sphere is entirely contained inside the N-cube. The resulting constellation then is bounded by the N-sphere and the actual $CER_1 \leq \beta$ (equality holds only if the diameter of the N-sphere is equal to the side of the N-cube).

The set of points in the optimally shaped constellation described above (assuming that $\delta$ is an odd integer) can be specified as the codebook of an N-dimensional SVQ with $Q = \{-(\delta-1)\alpha/2, -(\delta-3)\alpha/2, \ldots, -\alpha, 0, \alpha, \ldots, (\delta-1)\alpha/2; l_i = (q_i/\alpha)^2$ and L such that the constellation has (at least) $2^{Nr}$ points. The above constellations also give the best trade-off between the shaping gain $\gamma_s$ and the $PAR_1$.

FIGS. 8 and 9 give the shaping gain $\gamma_s$ for various values of $CER_1$ (and the corresponding $PAR_1$) for two different N. These values were obtained using Monte-Carlo simulations. For a given $CER_1 = \beta$ of the constituent 1D constellation, the $CER_2$ is upper-bounded by $\beta^2$ and the $PAR_2$ is upper-bounded by $PAR_1$ (for large N these quantities become equal to their bounds). FIGS.

8 and 9 also give these (upper-bound) values for the corresponding constituent 2D constellation. For these values of $CER_2$ and $PAR_2$ however, higher shaping gains are possible as shown next.

C.2. Optimal shaping for a given $CER_2$

The optimal shaping solution in this case is the generalization of the 1D solution described above. The required optimally shaped N-dimensional constellation of $2^{Nr}$ points (under the $CER_2 \leq \beta$ constraint) should have a circular constituent 2D constellation C with $\beta 2^{2r}$ points. The required constellation is hence constrained to be a subset of points enclosed by $C^{N/2}$, which is the N/2-fold cartesian product of C with itself. Proceeding as in the 1D case, we choose the points in the intersection of the interiors of $C^{N/2}$ and an N-sphere of appropriate radius so that the constellation has $2^{Nr}$ points. This ensures that we pick the $2^{Nr}$ minimum energy points that satisfy the $CER_2$ constraint (lie inside $C^{N/2}$). Hence the average power of this constellation is the minimum for the given size. The points of this constellation can also be described as the codebook of an SVQ but this is a little more involved than in the corresponding 1D case. The scalar quantization levels of the SVQ are replaced by the $\delta = \beta 2^{2r}$ points (2-tuples) $q_1, q_2, \ldots, q_{67}$ of the constituent 2D constellation, where $q_i = (q_{1i}, q_{2i})$. Therefore $Q = \{q_1, q_2, \ldots, q_{67}\}$. The length $l_i$ of the 2-tuple $q_i$ is the normalized squared-distance from the origin, i.e., $l_i = (1/\alpha^2)(q_{1i}^2 + q_{2i}^2)$. The threshold L is once again chosen such that the N/2-dimensional SVQ codebook consists of (at least) $2^{Nr}$ points. The SVQ encoding/decoding techniques will therefore index the constellation points. The optimally shaped constellation (under the $CER_2 \leq \beta$ constraint) also represents the best trade-off between shaping gain and $PAR_2$.

The optimal $\gamma_s$ (obtained by Monte-Carlo simulations) for various values of $CER_2$ and the corresponding $PAR_2$ are also shown in FIGS. 8 and 9 along with the asymptotic bounds (in N) and demonstrate that large shaping gains are indeed possible with a small $CER_2$.

D. Compatibility With Trellis-Coding

The above has discussed the optimal shaping of cubic lattice based N-dimensional constellations. These constellations have a large shaping gain but offer no coding gain. Since maximum achievable coding gains (up to 6 dB) are significantly larger than the maximum shaping gain of 1.53 dB, the present approach will be useful only if it allows constellations based on lattices or (trellis codes) denser than the cubic lattice. It was shown by G. Ungerboeck, "Channel Coding with Multilevel/Phase Signals," *IEEE Trans. Inform. Theory*, Vol. IT-28, pp. 55-67, January 1982, that trellis codes can be constructed from a redundant cubic lattice (that has a higher density of points than required) to achieve significant coding gains. The SVQ shaping scheme is indeed compatible with trellis coding and the two can be combined. This makes it possible to have SVQ-shaped trellis-coded modulation that has near optimal shaping gains and offers significant coding gains.

The SVQ-shaped trellis-coded modulation scheme is now described. The technique is general and any trellis that satisfies the two properties given below can be used. Other than these two properties, the scheme does not place a constraint on the trellis.

Figure 7:
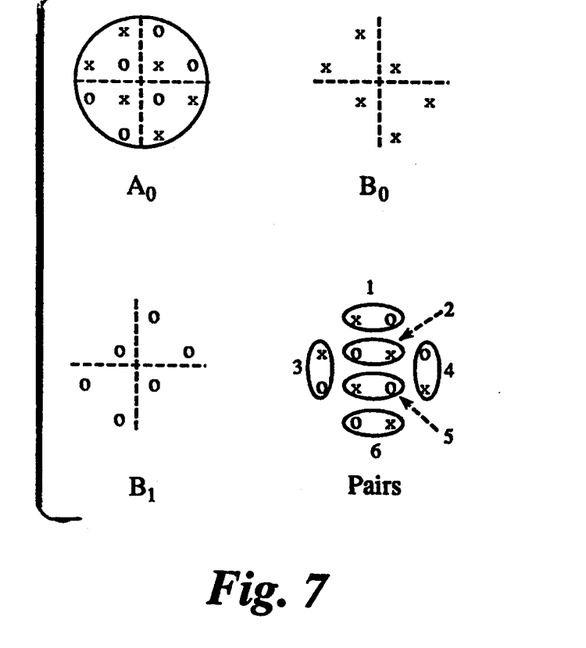
FIG. 7 shows a 2D constellation $A_0$, its partitions $B_0$ and $B_1$, and six pairs of points.

The two properties we require the trellises to possess are:

(1) The trellis partitions the given constituent 2D constellation $A_0$ into two subsets $B_0$ and $B_1$ (the case for a k subset partition is similar) such that the subsets have the same number (density) of points. Further, it is required that each point in $B_0$ can be paired with a point in $B_1$ that has the same energy. This last requirement is not for the trellis but the constituent 2D constellation $A_0$. Let the set of pairs be denoted by $P = \{P_1, P_2, \ldots, P_n\}$, where $P_i = (p_{1i}, p_{2i})$; $i \in J_n$, with $p_{1i} \in B_0$ and $p_{2i} \in B_1$. Also, to every pair $P_i$; $i \in J_n$, assign a length $l_i$ which is the (normalized) squared-distance of point $p_{1i}$ (or $p_{2i}$) from the origin, and let $L = \{l_1, l_2, \ldots, l_n\}$. FIG. 7 shows an example of a 2D constellation, its partitions and the pairs.

(2) All outgoing transitions from each state of the trellis are either associated with all points in $B_0$ or in $B_1$ but not both. In other words, the allowed points of $A_0$ in any given trellis state either constitute $B_0$ or $B_1$. This implies that given the initial state $s_0$ of the trellis, a sequence of pairs $D_1, D_2, \ldots, D_{N/2}$, where $D_i \in P$, can be uniquely decoded using the trellis into a sequence of points $d_1, d_2, \ldots, d_{N/2}$, where $d_i \in A_0$.

Figure 6:
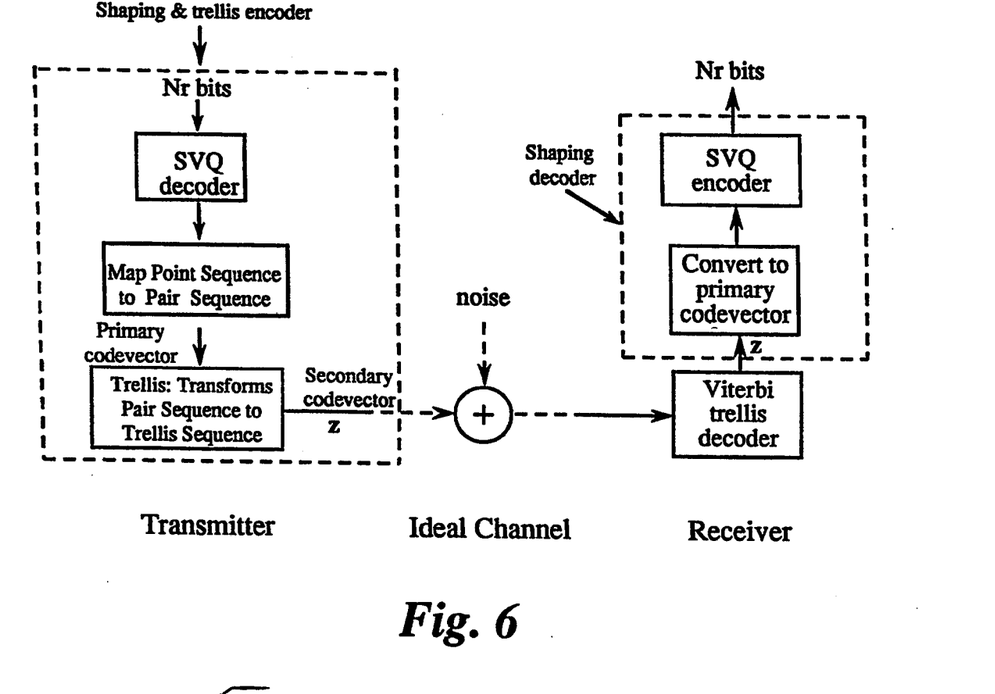
FIG. 6 shows the shaping encoder in the transmitter and the shaping decoder in the receiver using the SVQ technique.

Define an N/2-dimensional SVQ with (the quantization levels replaced by) the set of pairs P, the set of lengths L, and a threshold L. The codebook Z of this SVQ contains all N/2-tuples of 'pairs' $(D_1, D_2, \ldots, D_{N/2}) \in P^{N/2}$ which have a total length no greater than L. As usual, L is chosen such that the SVQ has (at least) $2^{Nr}$ of the N/2-tuples. Each of these N/2-tuples can be indexed by a unique Nr-bit binary number using the SVQ encoding/decoding techniques. We call the codebook Z the primary codebook or the primary constellation, and the pair N/2-tuples the primary codevectors. As mentioned above, if the initial state of the trellis is known, each of the primary codevectors can be decoded into a unique sequence of N/2 points in $A_0$. The $2^{Nr}$ primary codevectors, for a given initial state $s_i \in S$ (where S is the set of K trellis states), hence correspond to a set $Z_{si}$ of $2^{Nr}$ different N/2-tuples in $A_0^{N/2}$. Of the total of $n^{N/2}$ N/2-tuples in $A_0^{N/2}$ that are consistent with the trellis, $Z_{si}$ consists of only those $2^{Nr}$ that have the smallest energy. The set $Z_{si}$ is called the secondary codebook or the secondary constellation associated with the state $s_i$. Its constituent N/2-tuples (in $A_0^{N/2}$) are the secondary codevectors. For a K-state trellis there are K secondary constellations. Which one of these K secondary constellations will be used for the next transmission (of Nr bits) is determined by the (final) trellis state at the end of the previous transmission. FIG. 6 gives the block diagrams of the transmitter/receiver for the SVQ-shaped trellis-coded modulation scheme. First consider the transmitter. Assume that at the beginning the trellis state is known, say $s_0$. The first block of Nr bits to be transmitted is mapped, using the SVQ decoder, into a codevector in the primary codebook Z. The trellis (and the initial state $s_0$) is used to convert this primary codevector into a secondary constellation point z in $Z_{s0}$. The final state of the trellis at the end of this conversion is its initial state for the next transmission. The secondary constellation point z is transmitted as a sequence of N/2 points in $A_0$.

The receiver receives a noise affected sequence of N/2 points in $A_0$. Just as in the receiver of the conventional trellis-coded modulation scheme, a Viterbi (trellis) decoder is first used to recover the transmitted sequence of points in $A_0$. Assuming an error free recovery, the N/2-tuple (secondary constellation point) in $A_0^{N/2}$ is trivially converted to a primary codevector in the SVQ codebook Z, which is in turn decoded into an Nr-bit binary stream using the SVQ encoding technique.

The scheme described above is very general and can be split into the shaping part and the trellis coding/decoding part. The implementation of the shaping part, consisting of the SVQ decoder (in the transmitter) and the SVQ encoder (in the receiver), is independent of the details of the trellis.

Although the SVQ-shaped trellis-coded modulator is a dual of the trellis-based SVQ (TB-SVQ), it is much simpler to implement than the TB-SVQ as no codebook search is required since the receiver only performs Viterbi decoding (no codebook search) and the reconstructed sequence is assumed to be error free. However, in the above scheme there is one type of error that is easily detectable. It corresponds to the case when the reconstructed 'primary codevector' has a total length greater than the threshold L. This is called a constellation overload error. Clearly, this can only be the result of a channel error. This kind of error most likely results from the outermost points in the shaping region of the primary constellation. A simple way to deal with it is to let it cause bit-errors. Often, the knowledge that an error has occurred is useful even if the error cannot be corrected. A better but computationally more expensive way to deal with overload errors is to use the codebook search technique of the TB-SVQ in place of the simpler Viterbi trellis decoder. The codebook search will map the received data onto the closest 'allowed' (within the shaping region) secondary constellation point rather than the closest point on the trellis code. This does not guarantee error correction but reduces the probability of such errors. This gain is the result of the fact that the outermost constellation points in the shaping region have fewer neighbors than the inside points. Considering that for a large N, most of the constellation points are close to the boundary of the shaping region, codebook search might cause a small but significant reduction in the overall error probability. Furthermore, the codebook search only increases the complexity of the receiver and not the transmitter, and is required only when such an error is detected. For Voronoi constellations, such errors are not easy to detect and hence no such error correction possibility exists.

E. Best Mode of SVQ Encoding and Decoding Techniques

The techniques described below are generalizations of the previously described techniques (for 2 dimensions); they assume that the codebook dimension m is a power of 2, i.e., $m=2^K$.

For $m_i=m/2^{(i-1)}$, $i \in J_{K+1} \equiv \{1,2,\ldots,K+1\}$, let $M_{mi}^j$ represent the number of $m_i$-vectors $v \equiv (v_1, v_2, \ldots, v_{mi}) \in Q^{mi}$ that have a total length $l_{f(v1)}+l_{f(v2)}+\ldots+l_{f(vmi)}=j$. Clearly $M_{m(K+1)}^j=M^j$ is the number of elements in the SVQ alphabet Q that have a length equal to j. The $M_{mi}^j$ can be determined by the following recursive equation:

$$M_{mi}^j = \sum_{k=1}^{j-1} M_{m(i+1)}^{j-k} M_{m(i+1)}^k, \forall i \in J_K, \quad (3)$$

where $m_i=2m_{(i+1)}$ and each step doubles the dimension. The sequence $M_{mi}^j$, $j=1,2,3,\ldots$, hence results from the convolution of the sequence $M_{m(i+1)}^j$, $j=1,2,3,\ldots$, with itself. If $C_{mi}^j$ is the number of $m_i$-vectors $v \in Q^{mi}$ with a total length no greater than j, then $$C_{mi}^j = \sum_{k=1}^{j} M_{mi}^k \quad (4)$$

The SVQ threshold L is the minimum value of j for which $C_m^j=C_m^j \geq 2^{mr}$, where r is the desired rate of the SVQ in bits per SVQ dimension.

The encoding and decoding techniques described below assume that the $M_{mi}^j \forall i \in \{2,3,\ldots,K+1\}$, $j \in J_L$ and $C_m^j$, $\forall j \in J_L$, are computed once and stored in the memory. This takes up considerably less storage (especially for a large m) than storing the $M_k^j$ for all $k \in J_{m-1}$. It is further assumed that the SVQ alphabet $q_1,q_2,\ldots,q_n$, is indexed such that the corresponding lengths $l_1,l_2,\ldots,l_n$, form a non-decreasing sequence, i.e., the smaller lengths are assigned a smaller index.

The SVQ Encoding Technique (constellation point to binary index)

The encoding function assigns a unique mr-bit binary number to every codevector of the SVQ. The technique given here encodes an $m=2^K$-dimensional codevector by recursively splitting it into two equal parts. Let $^iv \equiv (v_1, v_2, \ldots, v_{mi})$ denote an $m_i=m/2^{(i-1)}$-dimensional vector in $Q^{mi}$. Also, let $^iv_1 \equiv (v_1,v_2,\ldots,v_{m(i+1)})$ and $^iv_2 \equiv (v_{m(i+1)+1},v_{m(i+1)+2},\ldots,v_{mi})$ be the first and the second halves of $^iv$, respectively. If $z \equiv (z_1,z_2,\ldots,z_m) \in Q^m$ is the codevector to be encoded, then let $^1v=z$.

Represent by $E^i:Q^{mi} \to \{0,1,2,\ldots\}$, the encoding function that encodes a vector $^iv \in Q^{mi}$ into a non-negative integer. Define $E^{K+1}:Q \to \{0,1,2,\ldots\}$, as $E^{K+1}(v)=f(v)-1$, $\forall v \in Q$, where $f(.)$ is the index function in the SVQ definition.

Assume that all $^iv_1$ and $^iv_2$ in $Q^{m(i+1)}$ have been indexed using $E^{i+1}$, i.e., $E^{i+1}(^iv_1)$ and $E^{i+1}(^iv_2)$ are the indexes of $^iv_1$ and $^iv_2$, respectively. Order all vectors in $Q^{m\ i}$ according to the following three rules: (i) a vector $^iu \in Q^{mi}$ is "smaller than" $^iw \in Q^{mi}$ (i.e., $^iu < ^iw$) if $T^i(^iu) < T^i(^iw)$, where the function $T^i(.)$ gives the total length of an $m_i$-vector $\in Q^{mi}$; (ii) if $T^i(^iu)=T^i(^iw)$, then $^iu < ^iw$ if $E^{i+1}(^iu_1) < E^{i+1}(^iw_1)$; and (iii) if $T^1(^iu)=T^i(^iw)$ and $E^{i+1}(^iu_1)=E^{i+1}(^iw)$, then $^iu < ^iw$ if $E^{i+1}(^iu_2) < E^{i+1}(^iw_2)$.

The encoding function $E^i(^iv)$ is now given as the number of vectors in $Q^{mi}$ that are smaller than $^iv$. This can be expressed as, $$E^i(^iv)=\epsilon^i(^iv)+C_{mi}^{T^i(^iv)-1}, \quad (5)$$

where $\epsilon^i(^iv)$ is the number of length $T^i(^iv)$ vectors in $Q^{mi}$ that are smaller than $^iv$ and is given as, $$\epsilon^i(^iv) = \sum_{k=1}^{T^{i+1}(^iv_1)-1} M_{m(i+1)}^k M_{m(i+1)}^{T^i(^iv)-k} + \epsilon^{i+1}(^iv_1) M_{m(i+1)}^{T^i(^iv)-T^{i+1}(^iv_1)} + \epsilon^{i+1}(^iv_2). \quad (6)$$

The encoding operation is hence performed by partitioning the input m-tuples into m/2 pairs and encoding the pairs using $E^K(.)$. The pairs are then grouped into 4-tuples and encoded using $E^{K-1}(.)$ and so on. The dependence of the storage complexity of this technique on the dimension is $m^2\log m$.

For a reduced storage requirement, the $C_m{}^j$, $\forall$ j $\in$ $J_L$ are stored in the memory only for i=1. For i $\in$ {2,3, ..., K+1}, the $C_m{}^j$ can be sparsely stored—as an example, for values of j that are multiples of 4. These can then be used together with the stored $M_m{}^j$ to obtain the $C_m{}^j$ for other values of j.

The SVQ Decoding Technique (binary index to constellation point)

The decoding function takes mr-bit binary numbers and converts them into SVQ codevectors in a one-to-one manner and is implemented as the inverse of the encoding function described above. The aim is to determine $z={}^1v \in Q^m$ given an mr-bit binary number $E^1({}^1v)$. This is accomplished by determining $E^2({}^1v_1)$ and $E^2({}^1v_2)$ from $E^1({}^1v)$. The problem now reduces to an equivalent (m/2)-dimensional problem which can be similarly handled.

To determine $E^2({}^1v_1)$ and $E^2({}^1v_2)$ from $E^1({}^1v)$, first determine $E^1({}^1v)$ and the length $T^1({}^1v)$ of ${}^1v$ using the stored values of $C_m{}^j$, j $\in J_L$. The values $T^2({}^1v_1)$, $E^2({}^1v_1)$, $T^2({}^1v_2)$ and $E^2({}^1v_2)$ are next determined form $E^1({}^1v)$ by repeated subtraction and a division.

The complexity of this decoding technique is approximately the same as that of the encoding technique.

F. SVQ Shaping at High Rates

Calderbank and Ozarow, "Nonequiprobable Signaling on the Gaussian Channel," *IEEE Trans. Inform. Theory*, Vol. 36, pp. 726–740, July 1990, have shown that it is in principle possible to achieve most of the maximum shaping gain of 1.53 dB by partitioning a circular 2D constellation (with a large number of points) into a small number, t, of equal area regions (circular shells) and using all the constellation points in a region with the same probability. Virtually all of the shaping gain can be achieved with just t=16 regions and a $CER_2$ less than about 2. For t=8 a shaping gain of over 1.4 dB can be realized. The shaping gain vs. $PAR_2$ plot for t=32 given in FIG. 4(e) in A. R. Calderbank and L. H. Ozarow, "Nonequiprobable Signaling on the Gaussian Channel," *IEEE Trans. Inform. Theory*, Vol. 36, pp. 726–740, July 1990, (the notation in [6] is different from that used here) is claimed to be indistinguishable from the optimal shaping gain vs. $PAR_2$ plot in G. D. Forney, Jr. and L. F. Wei, 37 Multidimensional Constellations—Part I: Introduction, Figures of Merit, and Generalized Cross Constellations," *IEEE J. Select. Area Commun.*, Vol. 7, No. 6, pp. 877–892, August 1989.

These results infer that nearly optimal SVQ shaping can be performed by partitioning a circular constituent 2D constellation into a maximum of t=16 regions and requiring that all the points in a region have the same length. This ensures that all points in the same region of the constituent 2D constellation occur with the same frequency in the multidimensional constellation. Since SVQ shaping can minimize the average constellation energy subject to the above constraint, for a given t, it can asymptotically (in dimension) achieve the performance described by Calderbank and Ozarow. The shaping gain for a given t is independent of the number of points in the constituent 2D constellation (assuming a large number of points). Therefore, the complexity of this SVQ shaping scheme for nearly optimal shaping does not continue to increase with the constellation rate r. Numerical results show that for r greater than about 6 bits/2D, the complexity is independent of the rate.

The above reduction in complexity when combined with the best mode SVQ encoding/decoding techniques described above makes it possible to achieve a higher shaping gain for a given complexity (or a given $CER_2$, $PAR_2$ or shaping delay) than any other shaping scheme proposed so far. In the next section, an example that demonstrates this concept is considered.

G. Example of an SVQ-Shaped Constellation

Assume that it is desired to transmit binary data using a 64-dimensional SVQ-shaped uncoded (trellis-coded constellations are considered later) $Z^{64}$ based constellation at the rate of 8 bits/2D. The constituent 2D constellation in this case must consist of at least 256 points. A circular 256-point 2D constellation however results in only 0.2 dB shaping gain (that of a circle over a square). To achieve higher shaping gains, the constituent 2D constellation must be expanded to have more than 256 points. In this example, we assume that a shaping $CER_2$ of 1.5 (corresponding to a 384-point 2D constellation) is acceptable. The 2D constellation $A_0$ hence consists of 384 points on the translated lattice $Z^2+(\frac{1}{2},\frac{1}{2})$ that are enclosed inside a circle of appropriate radius. The circular constellation $A_0$ is partitioned into t=12 subsets (regions) $R_1, R_2, \ldots, R_{12}$, each containing 32 points. The subset $R_1$ consists of the 32 lowest energy (smallest squared-distance from the origin) points in $A_0$, $R_2$ consists of the 32 next higher energy points in $A_0$ and so on. There are many different ways to pick the subsets $R_1, R_2, \ldots, R_{12}$, and any of these that preserves the $\pi/2$ rotational symmetry of $A_0$ can be chosen.

As suggested by the results of A. R. Calderbank and L. H. Ozarow, "Nonequiprobable Signaling on the Gaussian Channel," *IEEE Trans. Inform. Theory*, Vol. 36, pp. 726–740, July 1990, close to optimal shaping gain can be achieved by using all 32 points in any given subset $R_i$, i $\in J_{12}$ with the same probability. In the context of SVQ shaping, this can be accomplished by taking the SVQ alphabet as the 384 points in $A_0$ and assigning the same length to all points in the same subset. The threshold L can be determined such that the 32-dimensional SVQ codebook (corresponding to a 64-dimensional constellation) has $2^{=\times 8}=2^{256}$ codevectors (constellation points). Alternatively, in a more efficient formulation, the SVQ alphabet is taken as the 12 (n =t=12) subsets, i.e., $Q=\{q_1,q_2,\ldots,q_{12}\}=\{R_1,R_2,\ldots,R_{12}56$ and to every subset $R_i$, i E $J_{12}$, is assigned a length $l_i=i$. The threshold L in this case is determined such that the codebook Z of the 32-dimensional SVQ (m=32) consists of $2^{32\times 3}=2^{96}$ codevectors in $Q^{32}$. Each codevector here represents $2^{32\times 5}32 \cdot 2^{160}$ constellation points.

The transmitter in a QAM based system accepts binary data in blocks of $32\times 8=256$ bits and transmits each block using 32 2D-points (equivalent to one point on the 64-dimensional constellation). Out of the 256 bits in each block, the SVQ decoder decodes 96 bits into a codevector in $Q^{32}$. The additional 5 bits/2D (a total of 160 bits) are used to determine which point $\in A_0$ of each 32-point subset is transmitted. In the receiver, 5 bits/2D are recovered by determining which subset point was received and 96 bits are recovered by using the SVQ encoder to encode the received codevector.

The b 64-dimensional constellation in this example is a cubic lattice based constellation and realizes no coding gain. As shown above, SVQ shaping is compatible with trellis coding and it is possible to construct a 64-dimensional SVQ-shaped trellis-coded constellation from the 384-point circular 2D constellation $A_0$ considered above. Assuming that the trellis code used has a redundancy of 1 bit/2D, a rate of 7 bits/2D coded constellation then has the same shaping gain as the 8 bits/2D uncoded constellation.

Numerical evaluation shows that the above SVQ-shaped constellations achieve a shaping gain of 1.20 dB and have a $PAR_2=3.76$. The shaping operation requires about 60 multiply-adds/2D and 3 kbytes of memory. For $t=12$, a shaping gain of up to 1.26 dB can be realized with a $PAR_2$ of 5.25 by a 64-dimensional constellation (optimal 64-dimensional shaping results in up to 1.31 dB shaping gain). This is about 0.25 dB more than the 1 dB gain of Forney's 4-state trellis shaping scheme ($PAR_2 \approx 3.75$), see G. D. Forney, Jr., "Trellis Shaping," *IEEE Trans. Inform. Theory*, Vol 38, pp. 281–300, March 1992. Using 64-dimensional SVQ shaping, a gain of 1 dB results in a $PAR_2$ of only 2.9. This is even smaller than the $PAR_2$ of the baseline constellation that gives no shaping gain. Such small values of the $PAR_2$ can be useful for transmission over channels that introduce harmonic distortion at high signal levels.

The complexity of the shaping scheme in the example above can be further reduced with little or no effect on the shaping gain. This is done by repeatedly applying the ideas of Section II.F of the Detailed Description above to constituent constellations in 4, 8, 16 and 32 dimensions. For instance, the number $M_{8}{}^j$ is the total number of length $T^3({}^3v)=j$ points ($K=5$ and ${}^3v$ represents an 8-tuple in $Q^8$) in the constituent 16-dimensional constellation. The constituent 16-dimensional constellation can be divided into subsets (regions) of say, 1024 points each. The 1024 points with the smallest lengths belong to the first subset, the 1024 points with the next higher lengths belong to the next subset and so on. All points in the same subset are assigned the same length (this may be different from the original length of the points). This corresponds to modifying the numbers $M_8{}^j$, $j=1,2,3,\ldots$, to a new set $M_8{}^j$, where $M_8{}^j$ is the new number of points in the constituent 16-dimensional constellation with a modified length $T^3({}^3v)=j$. Also, let $C_8{}^j$ be the (new) number of points in the 16-dimensional constellation with (modified) length $T^3({}^3v) \leq j$.

The codeword $E^3({}^3v)$ of ${}^3v$ can now be used to determine $T^3({}^3v)$ and $e^3({}^3v)$ which is the number of modified length $T^3({}^3v)$ points in the constituent 16-dimensional constellation that are smaller than ${}^3v$.

For this approach, the encoding function of Section II.E is modified as follows:

$$E^i({}^iv) = \epsilon^i({}^iv) + C_{mi}^{T^i({}^iv)-1}, \quad (7)$$

where, $$\epsilon^i({}^iv) = \sum_{k=1}^{T^i({}^iv_1)-1} M_{m(i+1)}^k M_{m(i+1)}^{T^i({}^iv)-k} + \quad (8)$$

$$e^{i+1}({}^iv_1) M_{m(i+1)}^{T^i({}^iv)-T^{(i+1)}({}^iv_1)} + e^{i+1}({}^iv_2),$$

with $$M_{mi}^j = \sum_{k=1}^{j-1} M_{m(i+1)}^{j-k} M_{m(i+1)}^k, \quad (9)$$

$$C_{mi}^j = \sum_{k=1}^{j} M_{mi}^k, \quad (10)$$

and $$T^i({}^iv) = T^{i+1}({}^iv_1) + T^{i+1}({}^iv_2). \quad (11)$$

With the above modification, a variety of trade-offs between shaping gain, computational complexity and storage requirement are possible. Numerical evaluation shows that with 64-dimensional SVQ shaping, a shaping gain of about 1.2 dB can be realized at a $PAR_2$ of 3.75 with a worst case computational complexity of about 15 multiply-adds/2D and a storage requirement of around 1.5 kbytes.

H. Characteristics of SVQ Shaping

SVQ-shaped constellations have many desirable characteristics for use in QAM modems. SVQ shaping results in optimal shaping gains for a given $CER_2$ or $PAR_2$. Its implementation complexity is very reasonable and it is compatible with trellis coding. Other desirable characteristics include:

Phase symmetry: For QAM implementations, the constituent 2D constellation should be invariant to as many phase rotations as possible. This enables the carrier phase tracker at the receiver to converge quickly. Differential encoding is used to ensure that the resulting phase ambiguity (due to rotational invariance) does not lead to errors. Since optimal SVQ-shaped constellations are bounded by N-spheres which are invariant under any phase rotation, the phase symmetry of their constituent 2D constellations is determined only by the lattice on which they are based. A cubic lattice based constellation is invariant to $\pi/2$ phase rotations. Even for optimally shaped constellations under the $CER_2 \leq \beta$ constraint, the constituent 2D constellation is bounded by a circle and the phase symmetry is dictated only by the underlying lattice.

Scalability: Scaling of SVQ-shaped constellations is trivially possible by scaling the threshold L. Scaling the threshold by $\sigma$, assuming that the continuous approximation holds, scales the constellation size by $\sigma^{N/2}$.

Opportunistic secondary channels: For any value of the threshold L, it is usually not possible to have exactly $2^{Nr}$ points in the constellation. In this case L is taken as the minimum value of the threshold for which there are at least $2^{Nr}$ constellation points. Since there are usually more than the required number of points available on the constellation, one approach is to keep only the ones that are labeled from 0 to $2^{Nr}-1$ and not use the rest. The SVQ encoding technique of Section II of the Detailed Description above. A ensures that the points not used are those with the maximum energy (boundary points). Another approach is to associate some labels to more than one points on the boundary and choose any one of these points when such a label is to be transmitted. This allows the possibility of sending some additional information over the channel without increasing the average power. This secondary channel which is probabilistic in nature is called an opportunistic secondary channel and can be used to transmit low rate control data over the channel. The SVQ encoding technique as described in this disclosure labels the boundary constellation points with consecutive numbers (codewords) thus making it easy to identify these points and use the opportunistic secondary channel.

However, while a preferred embodiment of the invention has been described, variations and modifications can be made without departing from the spirit and the scope of the invention.

We claim:

1. A digital communication apparatus that transmits binary data from a transmitter to a receiver over a channel, the apparatus comprising:

means for receiving a stream of input binary data, a shaping encoder means for mapping a block of data from the stream of input binary data to a point in a constellation of dimension N having a constituent d-dimensional constellation, the constellation point being represented as a concatenation of i constituent points each from the constituent d-dimensional constellation where i and d are integers; wherein i) boundary of the constituent d-dimensional constellation is chosen to minimize the peak energy for a given predetermined data transmission rate and a given predetermined d-dimensional constellation expansion ratio, and boundary of the constellation approximating a boundary that maximizes shaping gain;

ii) the mapping from the block of data to the constellation point is invertible and is performed by:

(a) partitioning the constituent d-dimensional constellation into t groups of points where t is an integer, each group containing equal number of points;

(b) assigning an integer length to each point in a group, the length being a non-decreasing function of the average energy of all the points in that group;

(c) assigning a unique index between 1 and t to each of the t groups;

(d) assigning a total length to each constellation point, the total length being sum of the lengths of its i constituent points;

(e) ordering all the constellation points such that: i) constellation point with smaller total length precedes constellation point with larger total length, and. ii) for two constellation points with same total length, order depends on indices of groups that their i constituent points belong to, (f) assigning a unique binary address to each constellation point depending on its position in set of ordered constellation points; and (g) mapping the block of data to a constellation point that has same address as a binary number represented by the block of data.

2. The apparatus of claim 1 where the constellation points with same total length the ordering is further performed as a function of an i digit, base t number associated with each point, where i digits of the base t number are in a one-to-one correspondence with the i constituent points, each digit being one less than an index of a group that a corresponding constituent point belongs to.

3. The apparatus of claim 1 where N is a power of 2, $d=2$ and for constellation points with same total length, the ordering is further performed recursively by splitting each constellation point into two new points, each of half the dimension and mapping each new point to an address in a constellation of half the dimension; the order of the constellation points being a function of two addresses corresponding to each constellation point.

4. The apparatus of claim 1 where $d=2$ and further all the points in each group that the constituent 2-dimensional constellation is partitioned into are points contained in a region approximating a shape of an annulus.

5. A digital communication apparatus that transmits binary data from a transmitter to a receiver over a channel using a signal set based on a predetermined trellis code, where the trellis code is generated by partitioning a d-dimensional constellation $A_0$ into two subsets $B_0$ and $B_1$ in the first level of set partitioning, the apparatus comprising:

i) means for receiving a stream of input binary data;

ii) a shaping encoder means for mapping a block of data from the stream of input binary data to a point in an N-dimensional constellation having $B_0$ as constituent d-dimensional constellation, the constellation point being represented as a concatenation of i constituent points each from the constituent d-dimensional constellation where N, i and d are integers; wherein:

A) boundary or the constituent d-dimensional constellation is chosen to minimize the peak energy for a given predetermined data transmission rate and a given predetermined d-dimensional constellation expansion ratio, and boundary of the constellation approximating a boundary that maximizes shaping gain;

B) the mapping from the block of data to the constellation point is invertible and is performed by:

(a) partitioning the constituent d-dimensional constellation into t groups of points where t is an integer, each group containing equal number of points;

(b) assigning an integer length to each point in a group, the length being a non-decreasing function of the average energy of all the points in that group;

(c) assigning a unique index between 1 and t to each of the t groups;

(d) assigning a total length to each constellation point, the total length being sum of the lengths of its i constituent points;

(e) ordering all the constellation points such that: i) constellation point with smaller total length precedes constellation point with larger total length, and ii) for two constellation points with same total length, order depends on indices of groups that their i constituent points belong to, (f) assigning a unique binary address to each constellation point depending on its position in set of ordered constellation points; and (g) mapping the block of data to a constellation point that has same address as a binary number represented by the block of data;

iii) means for pairing each of the i constituent points of the N-dimensional constellation point to a point in $B_1$ of the same energy as the constituent point, thereby generating a sequence of i pairs; and iv) means for transforming the sequence of pairs, one pair at a time, into a trellis code sequence by choosing one point from each pair, where a point from a current pair is chosen based on a current trellis state which in turn is generated by a previous trellis state and a previous chosen point.

6. The apparatus of claim 5 wherein the channel is an intersymbol interference channel and further comprising a precoder means for modifying each sample of the trellis code sequence one at a time such that an input signal to a Viterbi trellis decoder in the receiver is a valid trellis code sequence where the said modifying of a current sample of the trellis code sequence is performed by subtracting a small dither sample which is a function of previous modified samples and the intersymbol interference characteristics of the channel.

7. A digital communication apparatus that transmits binary data from a transmitter to a receiver over a channel using a constellation based on a predetermined k-dimensional trellis code and having a constituent k-dimensional constellation $A_0$, where $A_0$ is partitioned into two subsets $B_0$ and $B_1$ in a first level of set partitioning used to generate the predetermined trellis code, where k is an integer, the apparatus comprising:
   i) means for receiving a stream of input binary data;
   ii) means for mapping the input binary data into sequence of pairs of points where each pair of points contains one point from $B_0$ and one point from $B_1$; and
   iii) means for transforming the sequence of pairs of points, one pair at time, into a trellis code sequence by choosing one point from each pair where a point from a current pair is chosen based on a current trellis state which in turn is generated by a previous trellis state and a previous chosen point.

8. The apparatus of claim 7 wherein both points in each pair of points in the sequence of pairs of points have same energy.

9. A digital communication apparatus that transmits binary data from a transmitter to a receiver over an intersymbol interference channel, the apparatus comprising:
   i) means for receiving a stream of input binary data;
   ii) means for mapping the input binary data into a trellis code sequence from a predetermined trellis code based on partitioning a lattice into a certain number of cosets; and
   iii) a precoder means for modifying each sample of the trellis code sequence one at a time such that an input to a Viterbi trellis decoder in the receiver is a valid trellis code sequence, where the said modifying of a current sample of the trellis code sequence is performed by subtracting a small dither sample which is a function of previous modified samples and intersymbol interference characteristics of the channel.

10. The apparatus of claim 9 wherein each dither sample which is subtracted from a sample of the trellis code sequence further lies inside the Voronoi region of a lattice of which the cosets are translates.

11. A digital communication apparatus that transmits binary data from a transmitter to a receiver over intersymbol interference channels with data processing components which are serially connected in the following order comprising:
   a) a means for entering input binary data to the apparatus,
   b) a data shaping encoder means for generating multidimensional signal constellation points,
   c) a trellis encoder means,
   d) a Laroia-Tretter-Farvardin (LTF) precoder means for shaping and modifying trellis encoded multidimensional signal constellation points before transmission,
   e) a transmit filter means,
   f) a channel filter means,
   g) a linear equalizer-sampler means,
   h) a noise prediction-error filter means H(z) for i) whitening noise introduced into the channel, ii) reducing the variance of the noise in the channel and iii) in combination with the LTF precoder, generating output binary data that is always a sequence consistent with the trellis encoder means,
   i) a Viterbi trellis decoder means for decoding the noise plus trellis sequence into a noiseless trellis sequence,
   j) an intersymbol interference removing filter 1/H (z) and a quantizer encoder means for performing the inverse operation of that performed by the LTF precoder means, and
   k) a shaping decoder means for outputting the binary data.

12. The apparatus of claim 11 wherein the data shaping encoder means and the shaping decoder means are a structured vector quantizer based shaping technique that provides shaping of the multidimensional constellation.

13. A method of transmitting and receiving data in a communication apparatus employing an encoder and decoder within the apparatus, the steps including:
   a) taking input binary data at the encoder and transforming by a structured vector quantizer decoder means for a rate r bits/dimension N-dimensional signal constellation shaping,
   b) using a structured vector quantizer based encoding means that converts constellation points to binary data sequences at the decoder within the apparatus, and
   c) mapping at the encoder that assigns a unique Nr-bit binary number to a codevector which is determined from a codebook Q that consists of $2^{Nr}$ codevectors, the decoder uses an inverse step of the encoder that assigns the codevector to the Nr-binary codeword wherein Nr is an integer.

14. The method of claim 13 wherein the mapping step comprises:
   a) determining the given codebook Q with the set of lengths L of integer lengths, a desired per sample rate r, and a threshold L of integer value that is determined by counting grid points in a manner that limits a constellation expansion ratio in two-dimension until there are $2^{Nr}$ points, and
   b) determining a largest total length for which all the grid-points of that length are included in a collection of the grid-points.

15. The method of claim 13 wherein the shaping of multidimensional signal constellations include the step of combining the constellation shaping with trellis coded modulation.

* * * * *